United States Patent
Rubin et al.

(10) Patent No.: US 10,084,629 B2
(45) Date of Patent: Sep. 25, 2018

(54) DEVICE AND METHOD OF PEAK-TO-AVERAGE POWER RATIO (PAPR) REDUCTION IN ACCORDANCE WITH A TARGET OUT-OF-BAND (OOB) EMISSION SPECTRUM

(71) Applicant: Intel IP Corporation, Santa Clara, CA (US)

(72) Inventors: Amir Rubin, Ramat Gan (IL); Uri Perlmutter, Holon (IL)

(73) Assignee: Intel IP Corporation, Santa Clara, CA (US)

( * ) Notice: Subject to any disclaimer, the term of this patent is extended or adjusted under 35 U.S.C. 154(b) by 60 days.

(21) Appl. No.: 15/269,308

(22) Filed: Sep. 19, 2016

(65) Prior Publication Data
US 2018/0083819 A1    Mar. 22, 2018

(51) Int. Cl.
| H04K 1/10 | (2006.01) |
| H04L 27/26 | (2006.01) |
| H04L 12/26 | (2006.01) |
| H04W 84/12 | (2009.01) |

(52) U.S. Cl.
CPC ........ H04L 27/2623 (2013.01); H04L 43/028 (2013.01); H04L 43/16 (2013.01); H04W 84/12 (2013.01)

(58) Field of Classification Search
CPC ... H04L 5/0007; H04L 27/2601; H04L 27/26; H04L 43/028; H04L 43/16; H04L 27/2623; H04L 27/367; H04L 27/04; H04L 27/3411; H04L 12/26; H04B 1/525; H04B 2001/0425; H04B 1/0057; H04B 1/1036; H04B 10/613; H04W 72/082; H04W 84/12

See application file for complete search history.

(56) References Cited

U.S. PATENT DOCUMENTS

2010/0027690 A1*    2/2010  Liang .................. H04L 27/2614
                                                                 375/260

* cited by examiner

*Primary Examiner* — Rahel Guarino
(74) *Attorney, Agent, or Firm* — Schwegman Lundberg & Woessner, P.A.

(57) ABSTRACT

Embodiments of a radio-circuit apparatus are generally described herein. The radio-circuit apparatus may comprise circuitry to generate an output baseband signal to reduce one or more localized peak power levels of an input baseband signal. The output signal may be based on a difference between an input baseband signal and an excess signal. The radio-circuit apparatus may further comprise a hard clipper circuit to restrict power levels of the input baseband signal to a clip range to generate a clipped signal. The radio-circuit apparatus may further comprise one or more filters to filter a predicted OOB emission signal in accordance with a target OOB emission spectrum. The predicted OOB emission signal may be based on a difference between the input baseband signal and the clipped signal.

21 Claims, 6 Drawing Sheets

DEVICE AND METHOD OF PEAK-TO-AVERAGE POWER RATIO (PAPR) REDUCTION IN ACCORDANCE WITH A TARGET OUT-OF-BAND (OOB) EMISSION SPECTRUM

TECHNICAL FIELD

Some embodiments pertain to peak-to-average power ratio (PAPR) reduction. Some embodiments relate to out-of-band (OOB) emissions. Some embodiments relate to wireless devices, including wireless devices configured to operating in a wireless local area network (WLAN). Some embodiments relate to notch filtering.

BACKGROUND

Communication devices may exchange various signals with other devices, such as data signals, control signals or other signals. As an example, a baseband signal may be input to a power amplifier before up-conversion to a radio frequency (RF) range for transmission. An RF channel or frequency band may be used for the transmission of the up-converted signal. In some cases, the transmission may cause splatter in adjacent frequency bands. Such splatter may be problematic for any number of reasons. As an example, the splatter may cause adverse effects to devices operating in the adjacent bands. As another example, regulations and/or emission masks for the adjacent bands may be challenging. Accordingly, there is a need for devices and components to reduce and/or control an amount of splatter in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
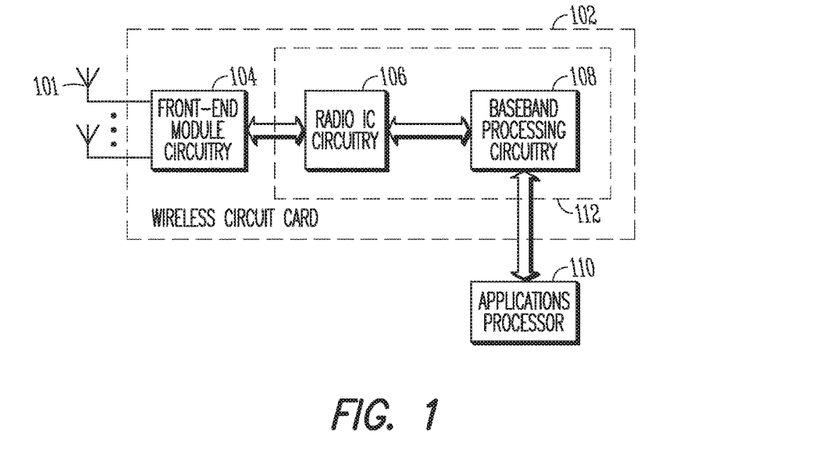
FIG. 1 is a block diagram of a radio architecture in accordance with some embodiments.

FIG. 1 is a block diagram of a radio architecture 100 in accordance with some embodiments. In some embodiments, some or all of the techniques or operations described herein may be applicable to the radio architecture 100 or other radio architectures. Some or all of the techniques described herein may be applicable to communication devices or other devices that may include a radio architecture such as 100 or other. However, the scope of embodiments is not limited in this respect, as some or all of the techniques or operations described herein may be applicable to other devices or architectures, in some embodiments. In some embodiments, some or all of the techniques or operations described herein may be applicable to devices or architectures that may not necessarily be related to a radio architecture or communication device.

Referring to FIG. 1, the radio architecture 100 may include front-end module circuitry 104, radio IC circuitry 106 and baseband processing circuitry 108. Front-end module circuitry 104 may include a receive signal path which may include circuitry configured to operate on RF signals received from one or more antennas 101, amplify the received signals and provide the amplified versions of the received signals to the radio IC circuitry 106 for further processing. Front-end module circuitry 104 may also include a transmit signal path which may include circuitry configured to amplify signals for transmission provided by the radio IC circuitry 106 for transmission by one or more of the antennas 101.

Radio IC circuitry 106 may include a receive signal path which may include circuitry to down-convert RF signals received from the front-end module circuitry 104 and provide baseband signals to the baseband processing circuitry 108. Radio IC circuitry 106 may also include a transmit signal path which may include circuitry to up-convert baseband signals provided by the baseband processing circuitry 108 and provide RF output signals to the front-end module circuitry 104 for subsequent transmission.

Baseband processing circuitry 108 may include one or more processors and control logic to process the baseband signals received from the receive signal path of the radio IC circuitry 106 and to generate the baseband signals for the transmit signal path of the radio IC circuitry 106. Baseband processing circuitry 108 may interface with applications processor 110 for generation and processing of the baseband signals and for controlling operations of the radio IC circuitry 106.

In some embodiments, the antennas 101, the front-end module circuitry 104, the radio IC circuitry 106, and baseband processing circuitry 108 may be provided on a single circuit card, such as wireless circuit card 102, although the scope of the embodiments is not limited in this respect. In some other embodiments, the antennas 101, the front-end module circuitry 104 and the radio IC circuitry 106 may be provided on a single circuit card. In some embodiments, the radio IC circuitry 106 and the baseband processing circuitry 108 may be provided on a single chip or integrated circuit (IC), such as IC 112, although the scope of the embodiments is not limited in this respect.

Figure 2:
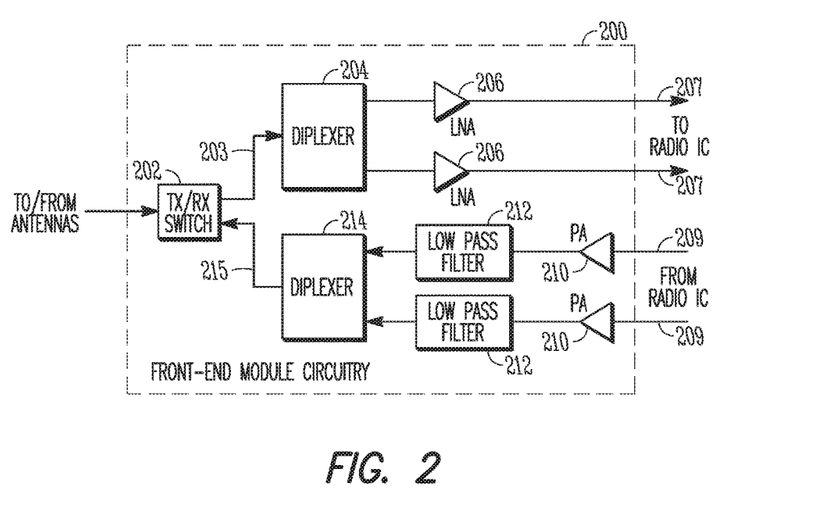
FIG. 2 illustrates front-end module circuitry in accordance with some embodiments.

FIG. 2 illustrates front-end module circuitry 200 in accordance with some embodiments. The front-end module circuitry 200 is one example of circuitry that may be suitable for use as the front-end module circuitry 104 (FIG. 1), although other circuitry configurations may also be suitable. In some embodiments, the front-end module circuitry 200 may include a TX/RX switch 202 to switch between transmit mode and receive mode operation. The front-end module circuitry 200 may include a receive signal path and a transmit signal path. The receive signal path of the front-end module circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the front-end module circuitry 200 may include a power amplifier (PA) 210 to amplify input RF signals 209 (e.g., provided by the radio IC circuitry 106), and one or more filters 212 to generate RF signals 215 for subsequent transmission (e.g., by one or more of the antennas 101 (FIG. 1)).

In some embodiments, the front-end module circuitry 200 may be configured to operate in multiple frequency bands. As a non-limiting example, either the 2.4 GHz frequency spectrum or the 5 GHz frequency spectrum may be used. As another example, more than two frequency bands may be used. In these embodiments, the receive signal path of the front-end module circuitry 200 may include a receive signal path diplexer 204 to separate the signals from each spectrum as well as a separate LNA 206 for each spectrum. In these embodiments, the transmit signal path of the front-end module circuitry 200 may also include a power amplifier 210 and a filter 212 for each frequency spectrum and a transmit signal path diplexer 214 to provide the signals of one of the different spectrums onto a single transmit path for subsequent transmission by the one or more of the antennas 101 (FIG. 1). These embodiments are not limiting, however, as the front-end module circuitry 200 may be configured to operate in one frequency band, in some cases.

Figure 3:
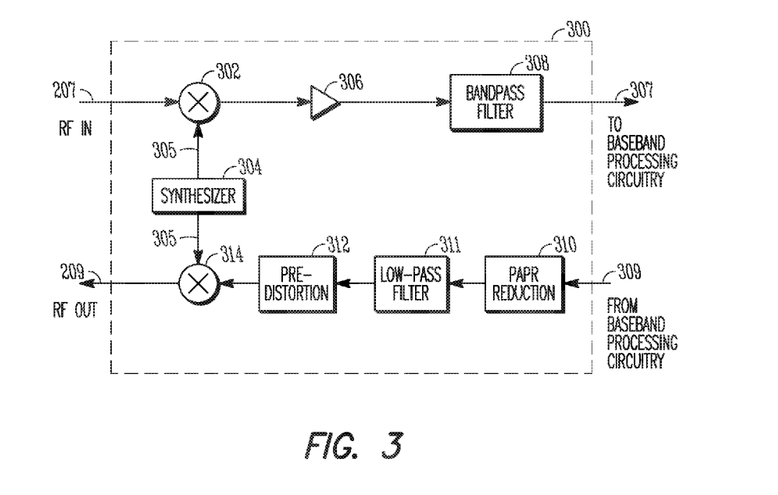
FIG. 3 illustrates radio IC circuitry in accordance with some embodiments.

FIG. 3 illustrates radio IC circuitry 300 in accordance with some embodiments. The radio IC circuitry 300 is one example of circuitry that may be suitable for use as the radio IC circuitry 106 (FIG. 1), although other circuitry configurations may also be suitable. In some embodiments, radio IC circuitry may include one or more components shown in the example radio IC circuitry 300. In some embodiments, radio IC circuitry may include one or more additional components. In some embodiments, radio IC circuitry may not necessarily include all components shown in the example radio IC circuitry 300.

In some embodiments, the radio IC circuitry 300 may include a receive signal path and a transmit signal path. The receive signal path of the radio IC circuitry 300 may include at least mixer circuitry 302, amplifier circuitry 306 and filter circuitry 308. The transmit signal path of the radio IC circuitry 300 may include at least filter circuitry 311 and mixer circuitry 314. The transmit signal path may also include peak-to-average power (PAPR) reduction circuitry 310 and/or pre-distortion circuitry 312. Radio IC circuitry 300 may also include synthesizer circuitry 304 for synthesizing a frequency 305 for use by the mixer circuitry 302 and/or the mixer circuitry 314.

In some embodiments, mixer circuitry 302 may be configured to down-convert RF signals 207 received from the front-end module circuitry 104 (FIG. 1) based on the synthesized frequency 305 provided by synthesizer circuitry 304. The amplifier circuitry 306 may be configured to amplify the down-converted signals and the filter circuitry 308 may be a band-pass filter (BPF) configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 309 based the synthesized frequency 305 provided by the synthesizer circuitry 304 to generate RF output signals 209 for the front-end module circuitry 104. The baseband signals 309 may be provided by the baseband processing circuitry 108 and may be processed by one or more of the PAPR reduction circuitry 310, filter circuitry 311 and/or pre-distortion circuitry 312. The filter circuitry 311 may include a low-pass filter (LPF), although the scope of the embodiments is not limited in this respect.

In some embodiments, the output baseband signals 307 and the input baseband signals 309 may be analog baseband signals, although the scope of the embodiments is not limited in this respect. In some alternate embodiments, the output baseband signals 307 and the input baseband signals 309 may be digital baseband signals. In these alternate embodiments, the radio IC circuitry may include analog-to-digital converter (ADC) and digital-to-analog converter (DAC) circuitry. In some dual-mode embodiments, a separate radio IC circuitry may be provided for processing signals for each spectrum, although the scope of the embodiments is not limited in this respect.

Figure 4:
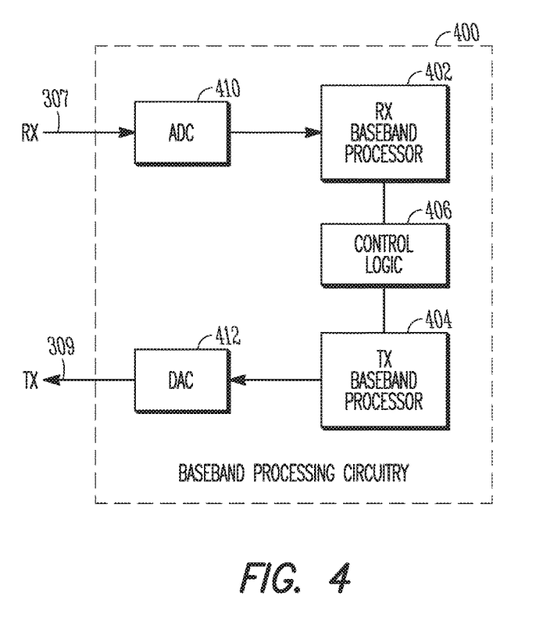
FIG. 4 illustrates a functional block diagram of baseband processing circuitry in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 307 provided by the radio IC circuitry 106 (FIG. 1) and a transmit baseband processor (TX BBP) 404 for generating transmit baseband signals 309 for the radio IC circuitry 106. The baseband processing circuitry 400 may also include control logic 406 for coordinating the operations with the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 504 to analog baseband signals.

Referring to FIG. 1, in some embodiments, the antennas 101 (FIG. 1) may comprise one or more directional or omnidirectional antennas, including, for example, dipole antennas, monopole antennas, patch antennas, loop antennas, micro-strip antennas or other types of antennas suitable for transmission of RE signals. In some multiple-input multiple-output (MIMO) embodiments, the antennas may be effectively separated to take advantage of spatial diversity and the different channel characteristics that may result.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ARCs), radio-frequency integrated circuits (RFICs) and combinations of various hardware and logic circuitry for performing at least the functions described herein. In some embodiments, the functional elements may refer to one or more processes operating on one or more processing elements.

In some embodiments, the radio architecture 100 may be part of a communication device such as a wireless local area network (WLAN) communication station (STA), a wireless access point (AP), user equipment (UE), an Evolved Node-B (eNB), a base station or a mobile device including a Wireless Fidelity (Wi-Fi) device. In some of these embodiments, radio architecture 100 may be configured to transmit and receive signals in accordance with specific communication standards, such as the Institute of Electrical and Electronics Engineers (IEEE) standards including IEEE 802.11-2012, 802.11n-2009, 802.11ac, and/or 802.11ax standards and/or proposed specifications for WLANs. In some embodiments, radio architecture 100 may be configured to transmit and receive signals in accordance with Third Generation Partnership Project (3GPP) standards including Long Term Evolution (LTE) standards. The scope of the embodiments is not limited in this respect, however, as the radio architecture 100 may also be suitable to transmit and/or receive communications in accordance with other techniques and standards. In addition, the radio architecture 100 may be configured to transmit and receive signals in multiple frequency bands in some embodiments.

In some embodiments, the radio architecture 100 may be part of a communication device such as a personal digital assistant (PDA), a laptop or portable computer with wireless communication capability, a web tablet, a wireless telephone, a smart-phone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the communication device may include one or more of a keyboard, a display, a non-volatile memory port, multiple antennas, a graphics processor, an application processor, speakers, and other mobile device elements. The display may be an LCD screen including a touch screen In some embodiments, the communication device may be or may be configured to operate as a mobile device and/or a stationary non-mobile device. As an example, the communication device may be an AP or an STA. In some embodiments, the communication device may also be, or may be part of, an apparatus for such a device. As an example, an STA may include the communication device in addition to other equipment, components or elements. As another example, an AP may include the communication device in addition to other equipment, components or elements. It should also be noted that some embodiments may be related to other electrical devices, electrical circuits or other devices that may or may not be related to communication.

In accordance with some embodiments, a radio-circuit apparatus may comprise circuitry to receive an input baseband signal and to generate an output baseband signal to reduce one or more localized peak power levels of the input baseband signal. The output signal may be based on a difference between the input baseband signal and an excess signal. The radio-circuit apparatus may further comprise a hard clipper circuit to restrict power levels of the input baseband signal to a clip range to generate a clipped signal. The radio-circuit apparatus may further comprise one or more filters to filter a predicted OOB emission signal in accordance with a target OOB emission spectrum. The predicted OOB emission signal may be based on a difference between the input baseband signal and the clipped signal. These embodiments will be described in more detail below.

Figure 5:
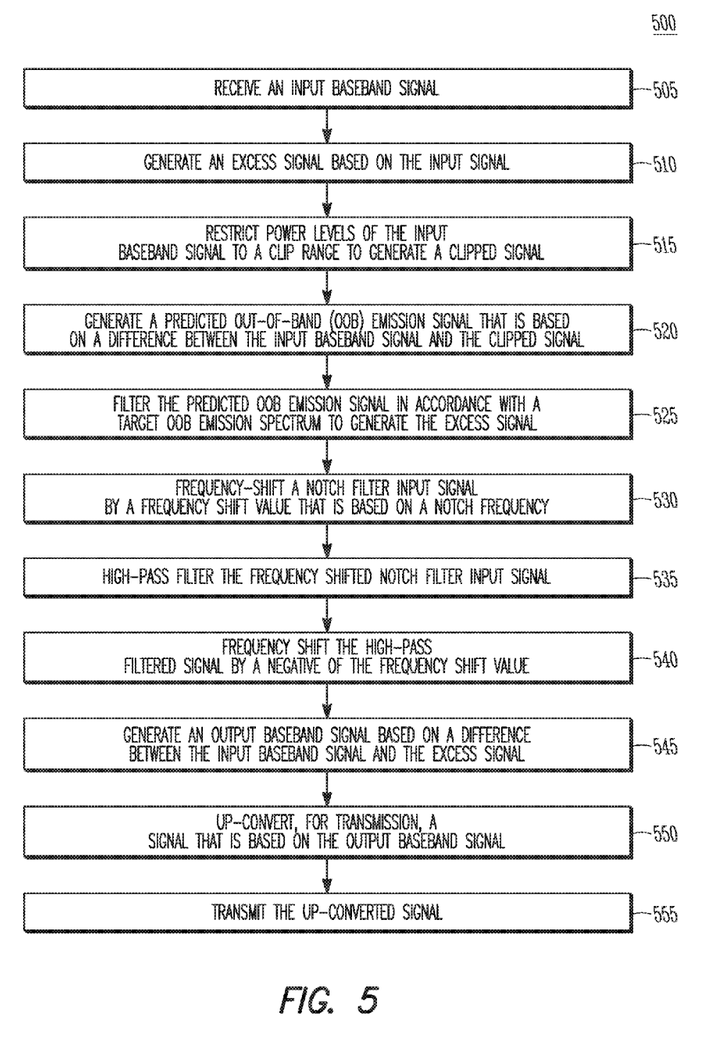
FIG. 5 illustrates the operation of an example method in accordance with some embodiments.

FIG. 5 illustrates the operation of an example method in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6, although it is understood that the method 500 may be practiced with any other suitable systems, interfaces and components. In some embodiments, one or more operations and/or techniques described herein (including but not limited to those of the method 500) may be performed by peak-to-average power ratio (PAPR) reduction circuitry 605 (and/or components of it) shown in FIG. 6. However, it is understood that such references are not limiting, as some or all of the techniques, operations and/or implementations may be applicable to other embodiments of PAPR reduction circuitry, in some cases.

Figure 6:
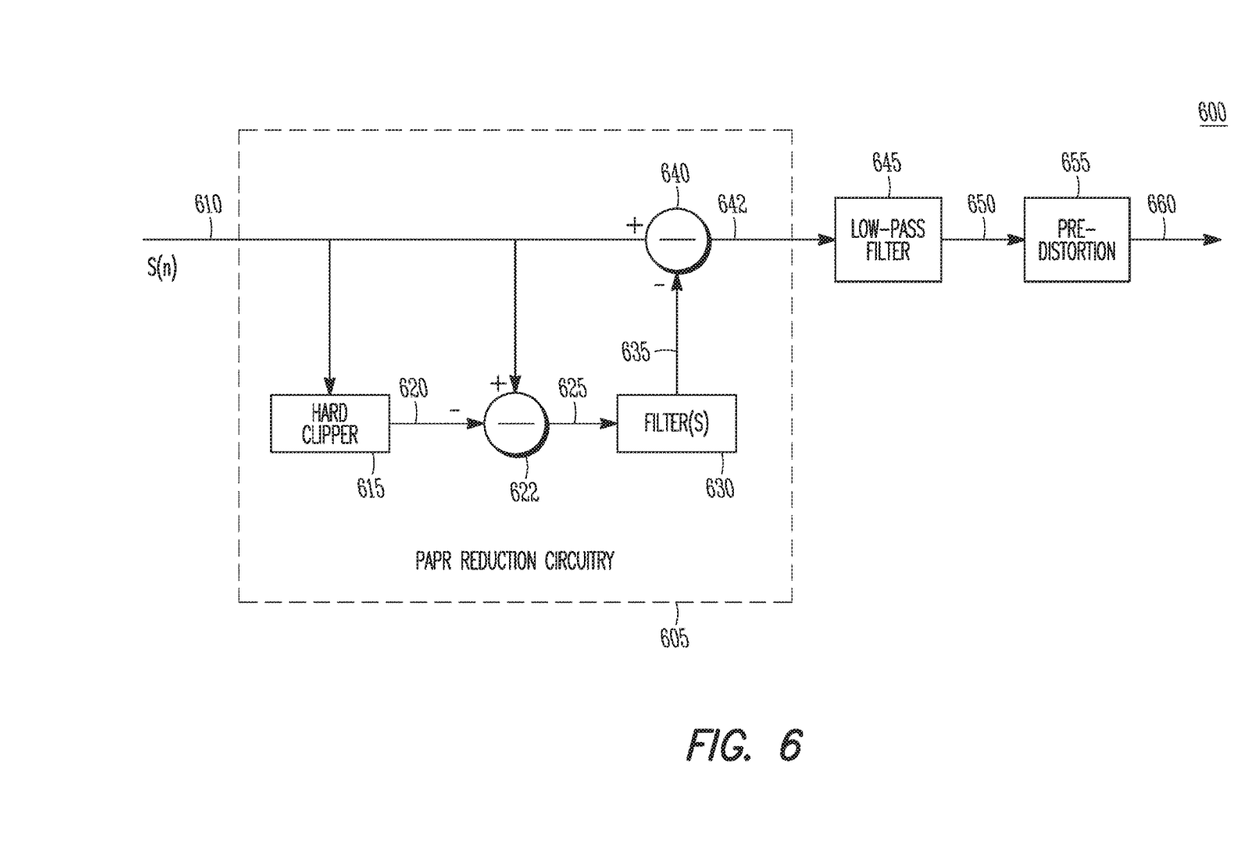
FIG. 6 illustrates example circuitry in accordance with some embodiments.

In addition, although the circuitry 605 is labeled as "PAPR reduction circuitry" in FIG. 6 and references may be made to the PAPR reduction circuitry 605 in descriptions herein, it is understood that embodiments are not limited to usage of dedicated PAPR reduction circuitry. Some or all of the operations and/or techniques described herein may be performed by other circuitry, such as a radio-circuit apparatus. The radio-circuit apparatus may include one or more components from one or more of FIGS. 1-4 and 6, in some embodiments. As an example, the radio-circuit apparatus may be or may include the PAPR reduction circuitry 605 shown in FIG. 6 and/or other PAPR reduction circuitry.

FIG. 6 illustrates example circuitry in accordance with some embodiments. In some embodiments, the example circuitry 600 may be included in a device, such as those described herein and/or other devices. It should be noted that concepts, methods (such as 500 and/or others), operations and/or techniques related to PAPR reduction circuitry may be described in terms of the example PAPR reduction circuitry 605 in FIG. 6 and/or the example circuitry 600 in FIG. 6, but such descriptions are not limiting. Some of the concepts, methods, operations and/or techniques may be applicable to other implementations of PAPR reduction circuitry and/or other circuitry, in some embodiments. It should be noted that embodiments are not limited by the number, type or arrangement of components shown in FIG. 6. Some embodiments may include additional components or alternate components, and some embodiments may not necessarily include all components shown in FIG. 6. Some embodiments may include components in an arrangement that may be different from the arrangement shown in FIG. 6.

In some embodiments, the method 500 may be performed by PAPR reduction circuitry 605 and/or by a device that includes the PAPR reduction circuitry 605, although the scope of embodiments is not limited in this respect. Some of the operations of the method 500 may be performed by different components of the PAPR reduction circuitry 605, in some cases. For instance, a first component of the PAPR reduction circuitry 605 may perform a first portion of the operations and a second component of the PAPR reduction circuitry 605 may perform a second portion of the operations. It should be noted that embodiments are not limited to the first and second components of the PAPR reduction circuitry 605. In some embodiments, more than two components may be included in the PAPR reduction circuitry 605, and any suitable number of components of the PAPR reduction circuitry 605 may perform one or more operations, in some embodiments. One or more of the operations of the method 500 may be performed by other components of the device, in some cases. For instance, FEM circuitry (such as 200 or other) may perform one or more operations.

In some embodiments, an output from a first component may be input to a second component. In some cases, the first and second components may be connected directly, such as through a wired connection, in which case the output from the first component may be input directly to the second component. In some cases, the first and second components may not necessarily be connected directly. For instance, one or more other components may be included in a path between the first and second components. Accordingly, the output from the first component may be affected, in some cases, by other components before being input to the second component. In such cases, the second component may receive the output from the first component indirectly. As an example, a filter may be included between the first and second components. It is understood that references to signals exchanged between components may include direct or indirect exchanges of the signals, in some embodiments.

At operation 505 of the method 500, an input baseband signal may be received. Referring to FIG. 6, the input baseband signal 610 (s(n)) may be received by the PAPR reduction circuitry 605. Any suitable baseband input signal 610 may be used. In some embodiments, a baseband processor (such as 404) and/or other component may generate the input baseband signal 610, although the scope of embodiments is not limited in this respect. As a non-limiting example, the baseband input signal 610 may be based on a group of data bits. Accordingly, one or more encode/transmit functions, such as error correction coding, interleaving, bit-to-symbol mapping and/or others, may be used to generate the baseband input signal 610 from the group of bits.

At operation 510, the PAPR reduction circuitry 605 may generate an excess signal 635 based on the input baseband signal 610. As a non-limiting example, the excess signal 635 may be subtracted from the input baseband signal 610 (such as by adder/subtractor 640) to reduce one or more peak amplitudes of the input baseband signal 610. In some embodiments, one or more of operations 515, 520, and 525 (described below) may be used to generate the excess signal 635, although embodiments are not limited as such.

At operation 515, the hard clipper 615 may clip the input baseband signal 610 to generate a clipped signal 620. In some embodiments, the hard clipper 615 may restrict power levels and/or amplitudes of the input baseband signal 610 to a clip range to generate the clipped signal 620. In some embodiments, the hard clipper 615 may clip the input baseband signal 610 in accordance with a fixed output gain for signal amplitudes below a predetermined threshold and a fixed output power for signal amplitudes above the threshold. That is, values of the signal amplitude that are below the threshold may be unchanged (or multiplied by a fixed gain) in the clipped signal 620 and values of the signal amplitude that are higher than the threshold may be limited to a fixed output level in the clipped signal 620. It should be noted that the hard clipper 615 may be a polar hard clipper, in some embodiments. In addition, embodiments are not limited to usage of a hard clipper 615, as other components that limit/restrict peaks of the signal may be used in some cases, including but not limited to soft clippers or limiters.

At operation 520, the PAPR reduction circuitry 605 (and/or the adder/subtractor 622) may generate a predicted out-of-band (OOB) emission signal 625 that is based on a difference between the input baseband signal 610 and the clipped signal 620. In some embodiments, OOB emissions of some signals, such as the clipped signal 620, may be dependent (and in some cases, may be highly dependent) on the predicted OOB emission signal 625.

As an example, the clipped signal 620 may be equal to (and/or based on) a difference between the input baseband signal 610 and the predicted OOB emission signal 625. Accordingly, a power spectral density (PSD) of the clipped signal 620 may be based on a summation that includes terms such as a PSD of the input baseband signal 610 and a PSD of the predicted OOB emission signal 625. In some cases, the PSD of the input baseband signal 610 may include less splatter than the PSD of the predicted OOB emission signal 625, and therefore the OOB emission(s) may be highly dependent on the predicted emission signal 625. This example will be extended to illustrate concepts in subsequent operations.

At operation 525, the PAPR reduction circuitry 605 (and/or the group of one or more filters 630) may filter the predicted OOB emission signal 625 in accordance with a target OOB emission spectrum to generate the excess signal 635. It should be noted that any suitable number and/or suitable combination of filters may be used to filter the predicted OOB emission signal 625. For instance, if the target OOB emission spectrum includes one or more notches, the group of filters 630 may include one or more notch filters for the notches. A notch filter may be used for each notch, in some cases, although embodiments are not limited as such. In addition, if the target OOB emission spectrum includes a low-pass portion (such as for a passband of the predicted OOB emission signal 625), a low-pass filter (LPF) may be used, in some embodiments. A cascade of multiple filters may be used, in some embodiments, although the scope of embodiments is not limited in this respect. In some embodiments, one or more of operations 530, 535, and 545 (described below) may be used as part of the filtering of the predicted OOB emission signal 625 (such as for notch-filtering), although embodiments are not limited as such. It should also be noted that a composite filter response may be implemented in any suitable manner, which may not necessarily include individual filters for individual portions of the target OOB emission spectrum. For instance, a single filter with a frequency response based on one or more notches and/or a low-pass portion may be implemented, in some embodiments.

In an example implementation of a notch filter at a particular target notch frequency, a notch filter input signal may be frequency-shifted toward zero frequency by a frequency shift value that is equal to and/or based on the particular target notch frequency (operation 530). The frequency-shifted signal may be high-pass filtered (operation 535). The high-pass filtered signal may be frequency-shifted away from zero frequency by the frequency shift value (and/or frequency-shifted by a negative of the frequency shift value) to generate a notch filter output signal (operation 540). Accordingly, for a positive target notch frequency, the notch filter input signal may be shifted down by the target notch frequency, high-pass filtered, then shifted back up by the target notch frequency. Similarly, for a negative target notch frequency, the notch filter input signal may be shifted up by the absolute value of the target notch frequency, high-pass filtered, then shifted back down by the absolute value of the target notch frequency. In some embodiments, frequency shift operations (including but not limited to those described in these examples) may be performed by one or more numerically controlled oscillators (NCOs) of the PAPR reduction circuitry, although the scope of embodiments is not limited in this respect.

It should be noted that any suitable filtering techniques may be used to perform one or more operations described herein, including but not limited to operation 525. As an example, one or more finite impulse response (FIR) filters may be used. As another example, one or more infinite impulse response (IIR) filters may be used. As another example, a combination of one or more FIR filters and one or more IIR, filters may be used. As another example, one or more additional filter types may be used in conjunction with FIR and/or IIR filters. These examples are not limiting, as other filtering techniques and/or methods may be used in some embodiments.

Examples of the target OOB emission spectrum will be described below, but the scope of embodiments is not limited by the examples in terms of type, shape, power level and/or other characteristic of the OOB emission spectrum. Any motivation for usage of a particular OOB emission spectrum and any techniques for determination of an OOB emission spectrum for usage are also not limited by the examples. It is understood that any suitable target OOB emission spectrum may be used in accordance with techniques, operations and/or methods described herein. In addition, although some or all examples described below may refer to notch filtering and/or notches in the target OOB emission spectrum, the scope of embodiments is not limited in this respect. It is understood that in some embodiments, other types of filtering may be performed, in addition to or instead of notch filtering. In addition, some target OOB emission spectra may include various characteristics in addition to or instead of notches, and the filtering operations may be performed to shape the signal spectrum in accordance with those characteristics.

In some embodiments, the target OOB emission spectrum may include one or more notches at one or more predetermined target notch frequencies. As a non-limiting example, the notches may be located outside of a pass-band of the input baseband signal 610. The scope of embodiments is not limited in this respect, however, as one or more notches may be included inside of the pass-band, in some embodiments. In some embodiments, the target OOB emission spectrum may include a low-pass portion to pass a desired signal. For instance, the desired signal may be based on the pass-band of the input baseband signal 610, a pass-band of the output baseband signal 642, a pass-band of the output baseband signal 642 converted up to a radio frequency (RF) range and/or other pass-band. It should also be noted that embodiments are not limited by these examples of target OOB emission spectra, as any suitable target OOB emission spectra may be used. As an example, the target OOB emission spectrum may not necessarily include any notches, in some embodiments. As another example, the target OOB emission spectrum may not necessarily include a low-pass portion, in some embodiments.

The target OOB emission spectrum may be determined and/or may be based on one or more suitable criteria. As a non-limiting example, a target notch frequency of the target OOB emission spectrum may be predetermined based at least partly on an operating frequency of an adjacent frequency band in a radio frequency (RF) range at which the output baseband signal 642 is to be transmitted (such as by FEM circuitry 104 or other). For instance, based on an a carrier frequency expected to be used by another device in an adjacent frequency band, a notch at that carrier frequency may be included in the target OOB emission spectrum. A notch bandwidth to be used for the notch may also be determined. For instance, the notch bandwidth may be determined based on an expected signal bandwidth to be used by the other device in the adjacent frequency band. The predicted OOB emission signal 625 may be filtered at least partly to reduce an expected OOB emission level that would be caused to the adjacent frequency band by the output baseband signal 642.

In some embodiments, the target OOB emission spectrum may include a target notch frequency that may be predetermined based at least partly on an excess level of OOB emission that is expected for the target notch frequency in comparison to a tolerable level of OOB emission for the target notch frequency. As an example, the target notch frequency may be predetermined to enable compliance, at the target notch frequency, with an OOB emission level of a predetermined OOB emission mask.

It should be noted that in some embodiments, the target OOB emission spectrum may include multiple notches. Each notch may be determined using any suitable technique(s). Different notches may be determined based on same technique(s), different technique(s) or a combination thereof, in some embodiments.

In some embodiments, the target OOB emission spectrum may include a first notch at a first target notch frequency and a second notch at a second target notch frequency. The second target notch frequency may be based on a negation of the first target notch frequency. The first and second target notch frequencies may be outside of a pass-band of the input baseband signal 610. In such cases, the group of filters may include a cascade of a low-pass filter (LPF), a first notch filter at the first target notch frequency, and a second notch filter at the second target notch frequency.

As a non-limiting example, the input baseband signal 610 may be based on a wireless local area network (W LAN) protocol. A two-sided bandwidth of the input baseband signal 610 may be 20 MHz, the first notch frequency may be at positive 30 MHz, and the second notch frequency may be at negative 30 MHz. For instance, the baseband signal (as a complex signal) may occupy a 20 MHz bandwidth in the range of (−10 MHz, 10 MHz) centered at zero frequency. A one-sided low-pass bandwidth of the LPF may be greater than a one-sided bandwidth of the input baseband signal 610 (10 MHz in this case). As a non-limiting example of a filter that may be used, a low-pass Butterworth filter (of 6 taps or any suitable number of taps) with a 3-dB point at 20 MHz may be used. As another non-limiting example of a filter that may be used, a notch filter implementation such as the example previously described (which includes frequency-shifting and high-pass filtering) may use a high-pass Butterworth filter with a 3-dB bandwidth of 10 MHz may be used. It should be noted that the values in the previous example (and/or other examples herein) are not limiting, as any suitable value(s) may be used for parameters such as the notch frequencies, bandwidths, 3-dB points, number of taps, filter size and/or others, in some cases.

Figure 7:
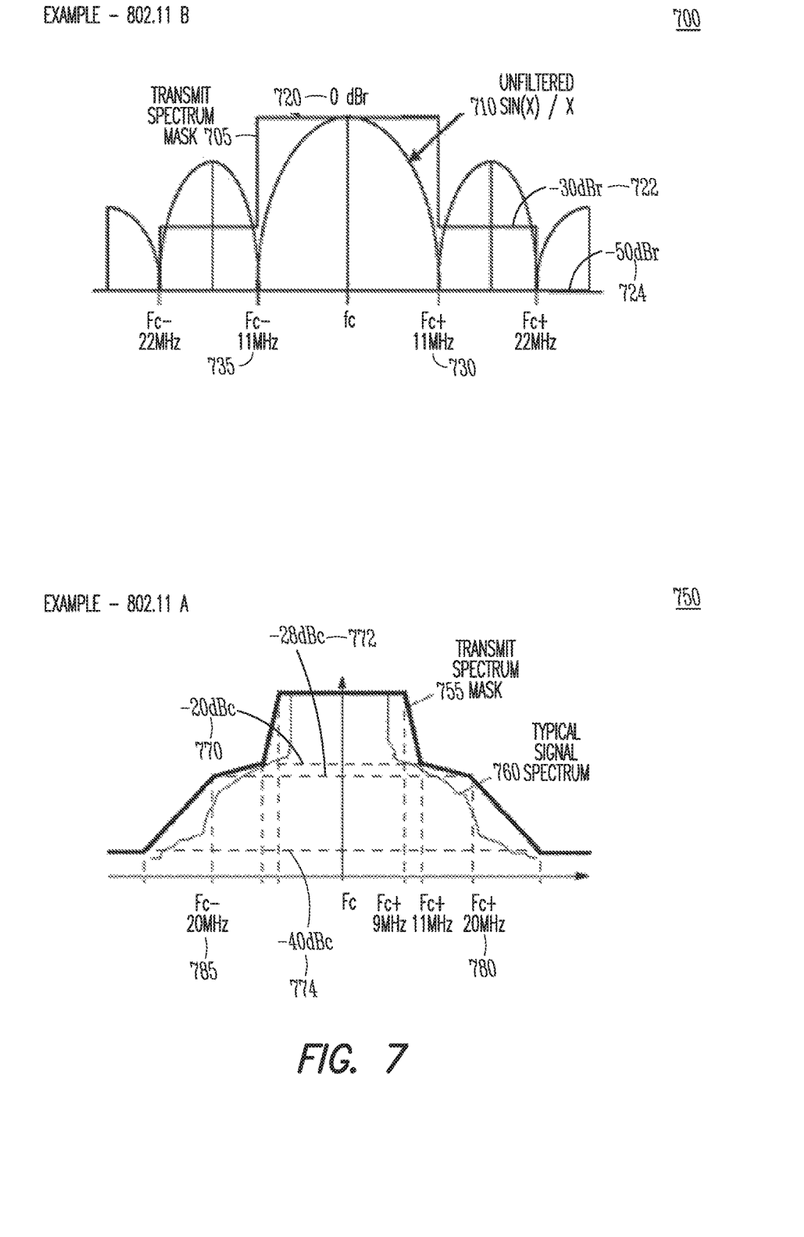
FIG. 7 illustrates examples of spectra in accordance with some embodiments.

FIG. 7 illustrates example spectra in accordance with some embodiments. It should be noted that embodiments are not limited by the example spectra 700, 750 and/or the example transmit spectrum masks 705, 755 in terms of size, shape, frequency range, attenuation, number of frequency ranges, OOB target frequencies and/or other characteristics. The example 700 may be applicable to 802.11b operation, although the scope of embodiments is not limited in this respect. The example 750 may be applicable to 802.11a operation, although the scope of embodiments is not limited in this respect. In some embodiments, the input baseband signal may be restricted to operation in accordance with a transmit spectrum mask such as 705, 755 or other. As an example, one or more frequency points of those masks 705, 755 may indicate one or more target notch frequencies. As another example, other target notch frequencies may be determined for another case based on a transmit spectrum masks for that case.

Referring to the example 700 for 802.11b operation, the transmit spectrum mask 705 is compared to a sine function 710. Different target attenuation values 720, 722, 724 of 0 dBr, −30 dBr, and −50 dBr for the mask 705 are mapped to different frequency values, in this example 700. As a non-limiting example, notches may be determined for a target OOB spectrum at offsets of +11 MHz and −11 MHz from the carrier frequency fc (as indicated by 730 and 735).

Referring to the example 750 for 802.11a operation, a non-limiting example signal spectrum 760 is compared to the transmit spectrum mask 755. Different target attenuation values 770, 772, 774 of −20 dBc, −28 dBc, and −40 dBc for the mask 755 are mapped to different frequency values, in this example 750. As a non-limiting example, notches may be determined for a target OOB spectrum at offsets of +20 MHz and −20 MHz from the carrier frequency fc (as indicated by 780 and 785).

In some embodiments, one or more target notch frequencies and/or other characteristics of target OOB emission spectra used for a device may be based on one or more factors, including but not limited to a Long Term Evolution (LTE) channel that is near to and/or adjacent to an operating frequency range of the device; a Wi-Fi channel that is near to and/or adjacent to the operating frequency range of the device, a frequency range in which Bluetooth (BT) may be operating, in which the frequency range is near to and/or adjacent to the operating frequency range of the device; and/or a frequency range that may be challenging to OOB emission of Wi-Fi operation (by the device). These example factors are not limiting, however, as one or more factors may also be used, in addition to or instead of one or more of those described above, in some embodiments.

At operation 545, the PAPR circuitry 605 (and/or the adder/subtractor 640) may generate an output baseband signal 642 based on a difference between the input baseband signal 610 and the excess signal 635. In some cases, one or more localized peak power levels of the input baseband signal 610 may be reduced in the output baseband signal 642. In some cases, a peak signal amplitude/power of the output baseband signal 642 may be reduced in comparison to a peak signal amplitude/power of the input baseband signal 610. In some embodiments, the output baseband signal 642 may be generated for input to front-end module (FEM) circuitry (such as 104) and/or other component for transmission in a frequency band in a radio frequency (RF) range. It should be noted that one or more other components, such as the LPF 645, pre-distortion circuitry 650 and/or other components may be part of a path that connects the PAPR reduction circuitry 605 to the FEM circuitry, in some embodiments.

In some embodiments, PAPR reduction circuitry (such as 605 or other) may reduce a peak amplitude of a signal (such as the input baseband signal 610 or other) in order to provide a peak-limited signal (such as the output baseband signal 642 or other) for usage by a power amplifier (such as 210 or other). In some cases, multiple values may be reduced by PAPR reduction circuitry, such as multiple peaks, multiple localized peaks, one or more portions of signals above a threshold and/or other portions of the signal. In some embodiments, the output baseband signal 642 may be generated to jointly reduce the peak power levels of the input baseband signal 610 and to shape an OOB emission spectrum of the output baseband signal 642 in accordance with the target OOB emission spectrum. For instance, the filtering of the predicted OOB emission signal 625 (which may contribute largely to the OOB emissions, as described earlier) and the subtraction of the filtered predicted OOB emission signal 635 to reduce the peak values described above may be performed. It should be noted that reduction of such peaks and/or other portions of the signal may cause splatter to adjacent frequency bands, in some cases. As the splatter may be problematic, filtering of the predicted OOB emission signal 625 in accordance with the target OOB emission spectrum may be used.

At operation 550, the output baseband signal 642 and/or a signal based on the output baseband signal 642 may be up-converted for transmission in the RF range. At operation 555, the up-converted signal may be transmitted.

In Example 1, a radio-circuit apparatus may comprise circuitry to receive an input baseband signal and to generate an output baseband signal to reduce one or more localized peak power levels of the input baseband signal. The output baseband signal may be based on a difference between the input baseband signal and an excess signal. The PAPR reduction circuitry may further comprise a hard clipper circuit to restrict power levels of the input baseband signal to a clip range to generate a clipped signal. The PAPR reduction circuitry may further comprise a group of one or more filters to receive a predicted out-of-band (OOB) emission signal that is based on a difference between the input baseband signal and the clipped signal. The group of one or more filters may filter the predicted OOB emission signal in accordance with a target OOB emission spectrum to generate the excess signal.

In Example 2, the subject matter of Example 1, wherein the output baseband signal may jointly reduce the peak power levels of the input baseband signal and shape an OOB emission spectrum of the output baseband signal in accordance with the target OOB emission spectrum.

In Example 3, the subject matter of one or any combination of Examples 1-2, wherein the output baseband signal may be input to front-end module (FEM) circuitry for transmission in a frequency band in a radio frequency (RF) range.

In Example 4, the subject matter of one or any combination of Examples 1-3, wherein the target OOB emission spectrum may include a notch at a predetermined target notch frequency outside of a pass-band of the input baseband signal. The predetermined target notch frequency may be based at least partly on an operating frequency of an adjacent frequency band in the RF range. The filtered predicted OOB emission signal may reduce an expected OOB emission level that would be caused to the adjacent frequency band by the output baseband signal.

In Example 5, the subject matter of one or any combination of Examples 1-4, wherein the target OOB emission spectrum may include a group of one or more notches at a group of one or more predetermined target notch frequencies.

In Example 6, the subject matter of one or any combination of Examples 1-5, wherein at least one of the predetermined target notch frequencies may be based at least partly on an excess level of OOB emission that is expected for the target notch frequency in comparison to a tolerable level of OOB emission for the target notch frequency.

In Example 7, the subject matter of one or any combination of Examples 1-6, wherein the group of filters may include a low-pass filter (LPF) of a low-pass bandwidth that is greater than a bandwidth of the baseband input signal. The group of filters may further include one or more notch filters at the target notch frequencies.

In Example 8, the subject matter of one or any combination of Examples 1-7, wherein at least one of the notch filters may be configured to frequency-shift a notch filter input signal toward zero frequency by a frequency shift value that is based on the corresponding target notch frequency; high-pass filter the frequency-shifted notch filter input signal; and frequency-shift an output signal of the high-pass filter away from zero frequency by the frequency shift value to generate a notch filter output signal.

In Example 9, the subject matter of one or any combination of Examples 1-8, wherein one or more numerically controlled oscillators (NCOs) of the radio-circuit apparatus may perform the frequency shift operations.

In Example 10, the subject matter of one or any combination of Examples 1-9, wherein the target OOB emission spectrum may include a first notch at a first target notch frequency and a second notch at a second target notch frequency. The second target notch frequency may be based on a negation of the first target notch frequency. The first and second target notch frequencies may be outside of a pass-band of the input baseband signal.

In Example 11, the subject matter of one or any combination of Examples 1-10, wherein the group of filters may include a cascade of a low-pass filter (LPF), a first notch filter at the first target notch frequency, and a second notch filter at the second target notch frequency.

In Example 12, the subject matter of one or any combination of Examples 1-11, wherein the PAPR circuitry may be configured to operate in accordance with a wireless local area network (WLAN) protocol. A bandwidth of the input baseband signal may be 20 MHz, the first notch frequency may be at positive 30 MHz, and the second notch frequency may be at negative 30 MHz.

In Example 13, a method of joint peak amplitude reduction and out-of-band (OOB) emission filtering may comprise clipping an input baseband signal in accordance with a fixed output gain for signal amplitudes below a predetermined threshold and a fixed output power for signal amplitudes above the threshold. The method may further comprise generating a predicted OOB emission signal based on a difference between the input baseband signal and the clipped input baseband signal. The method may further comprise filtering the predicted OOB emission signal in accordance with a target OOB emission spectrum that includes one or more notches outside of a pass-hand of the input baseband signal. The method may further comprise generating an output baseband signal based on a difference between the input baseband signal and the filtered predicted OOB emission signal. A peak signal amplitude of the output baseband signal may be reduced in comparison to a peak signal amplitude of the input baseband signal.

In Example 14, the subject matter of Example 13, wherein at least one of the notches may enable compliance, at a target notch frequency, with an OOB emission level of a predetermined OOB emission mask.

In Example 15, the subject matter of one or any combination of Examples 13-14, wherein the filtering may include low-pass filtering in accordance with a low-pass bandwidth that is greater than a bandwidth of the baseband input signal. The notches of the target OOB emission spectrum may be at predetermined target notch frequencies. The filtering may include notch-filtering at the target notch frequencies.

In Example 16, the subject matter of one or any combination of Examples 13-15, wherein the method may further comprise frequency-shifting a notch filter input signal toward zero frequency by a frequency shift value that is based on the corresponding target notch frequency; high-pass filtering the frequency-shifted notch filter input signal; and frequency-shifting an output signal of the high-pass filter away from zero frequency by the frequency shift value to generate a notch filter output signal.

In Example 17, an apparatus of a communication device may comprise a hard clipper and a group of one or more filters. The hard clipper and the group of filters may be arranged to generate an excess signal for usage in a reduction of a peak power of an input baseband signal. The hard clipper may restrict power levels of the input baseband signal to a clip range to generate a clipped signal. The group of filters may receive a predicted out-of-band (OOB) emission signal that is based on a difference between the input baseband signal and the clipped signal. The group of filters may filter the predicted OOB emission signal in accordance with a target OOB emission spectrum to generate the excess In Example 18, the subject matter of Example 17, wherein the apparatus may further comprise front-end module (FEM) circuitry to up-convert, to a radio frequency (RF) range for transmission, an FEW input signal that is based on a difference between the baseband input signal and the excess signal.

In Example 19, the subject matter of one or any combination of Examples 17-18, wherein the excess signal may jointly reduce the peak power of the input baseband signal and shape an OOB emission spectrum of the FEM signal in accordance with the target OOB emission spectrum.

In Example 20, the subject matter of one or any combination of Examples 17-19, wherein the target OOB emission spectrum may include a notch at a predetermined target notch frequency outside of a pass-band of the input baseband signal. The predetermined target notch frequency may be based at least partly on an operating frequency of an adjacent frequency band in the RF range. The filtered predicted OOB emission signal may reduce an expected OOB emission level that would be caused to an adjacent frequency by an output baseband signal that is based on a difference between the input baseband signal and the excess signal.

In Example 21, the subject matter of one or any combination of Examples 17-20, wherein the apparatus may further comprise a baseband processor to generate the input baseband signal based on a group of data bits.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A radio-circuit apparatus, comprising:
    circuitry to receive an input baseband signal and generate an output baseband signal, wherein the output baseband signal is based on a difference between the input baseband signal and an excess signal;
    a hard clipper circuit to restrict one or more localized peak power levels of the input baseband signal to a clip range to generate a clipped signal; and
    a group of one or more filters to:
    receive a predicted out-of-band (OOB) emission signal that is based on a difference between the input baseband signal and the clipped signal; and
    filter the predicted OOB emission signal in accordance with a target OOB emission spectrum to generate the excess signal.

2. The radio-circuit apparatus according to claim 1, wherein the output baseband signal jointly reduces the one or more localized peak power levels of the input baseband signal, and shapes an OOB emission spectrum of the output baseband signal in accordance with the target OOB emission spectrum.

3. The radio-circuit apparatus according to claim 1, wherein the output baseband signal is input to front-end module (FEM) circuitry for transmission in a frequency band in a radio frequency (RF) range.

4. The radio-circuit apparatus according to claim 3, wherein:
the target OOB emission spectrum includes a notch at a predetermined target notch frequency outside of a pass-band of the input baseband signal,
the predetermined target notch frequency is based at least partly on an operating frequency of an adjacent frequency band in the RF range, and
the filtered predicted OOB emission signal reduces an expected OOB emission level that would be caused to the adjacent frequency band by the output baseband signal.

5. The radio-circuit apparatus according to claim 1, wherein the target OOB emission spectrum includes a group of one or more notches at a group of one or more predetermined target notch frequencies.

6. The radio-circuit apparatus according to claim 5, wherein at least one of the predetermined target notch frequencies is based at least partly on an excess level of OOB emission that is expected for the at least one predetermined target notch frequency in comparison to a tolerable level of OOB emission for the at least one predetermined target notch frequency.

7. The radio-circuit apparatus according to claim 5, wherein:
the group of one or more filters includes a low-pass filter (LPF) of a low-pass bandwidth that is greater than a bandwidth of the baseband input signal, and
the group of one or more filters further includes one or more notch filters at the target notch frequencies.

8. The radio-circuit apparatus according to claim 7, wherein at least one of the notch filters is configured to:
frequency-shift a notch filter input signal toward zero frequency by a frequency shift value that is based on the corresponding target notch frequency;
high-pass filter the frequency-shifted notch filter input signal; and
frequency-shift an output signal of the high-pass filter away from zero frequency by the frequency shift value to generate a notch filter output signal.

9. The radio-circuit apparatus according to claim 8, wherein one or more numerically controlled oscillators (NCOs) of the radio-circuit apparatus perform the frequency shift operations.

10. The radio-circuit apparatus according to claim 5, wherein:
the target OOB emission spectrum includes a first notch at a first target notch frequency and a second notch at a second target notch frequency,
the second target notch frequency is based on a negation of the first target notch frequency, and
the first and second target notch frequencies are outside of a pass-band of the input baseband signal.

11. The radio-circuit apparatus according to claim 10, wherein the group of one or more filters includes a cascade of a low-pass filter (LPF), a first notch filter at the first target notch frequency, and a second notch filter at the second target notch frequency.

12. The radio-circuit apparatus according to claim 10, the circuitry configured to operate in accordance with a wireless local area network (WLAN) protocol, wherein:
a bandwidth of the input baseband signal is 20 MHz,
the first target notch frequency is at positive 30 MHz, and
the target second notch frequency is at negative 30 MHz.

13. A method of joint peak amplitude reduction and out-of-band (OOB) emission filtering, the method comprising:
clipping an input baseband signal in accordance with a fixed output gain for signal amplitudes below a predetermined threshold and a fixed output power for signal amplitudes above the predetermined threshold;
generating a predicted OOB emission signal based on a difference between the input baseband signal and the clipped input baseband signal;
filtering the predicted OOB emission signal in accordance with a target OOB emission spectrum that includes one or more notches outside of a pass-band of the input baseband signal; and
generating an output baseband signal based on a difference between the input baseband signal and the filtered predicted OOB emission signal,
wherein a peak signal amplitude of the output baseband signal is reduced in comparison to a peak signal amplitude of the input baseband signal.

14. The method according to claim 13, wherein at least one of the notches enables compliance, at a target notch frequency, with an OOB emission level of a predetermined OOB emission mask.

15. The method according to claim 13, wherein:
the filtering includes low-pass filtering in accordance with a low-pass bandwidth that is greater than a bandwidth of the baseband input signal, and
the one or more notches of the target OOB emission spectrum are at predetermined target notch frequencies, and
the filtering includes notch-filtering at the target notch frequencies.

16. The method according to claim 15, the method further comprising:
frequency-shifting a notch filter input signal toward zero frequency by a frequency shift value that is based on the corresponding target notch frequency;
high-pass filtering the frequency-shifted notch filter input signal; and
frequency-shifting an output signal of the high-pass filter away from zero frequency by the frequency shift value to generate a notch filter output signal.

17. An apparatus of a communication device, the apparatus comprising:
a hard clipper; and a group of one or more filters;
wherein the hard clipper and the group of one or more filters are arranged to generate an excess signal for usage in a reduction of a peak power of an input baseband signal,
wherein the hard clipper is to restrict power levels of the input baseband signal to a clip range to generate a clipped signal,
wherein the group of one or more filters are to:
receive a predicted out-of-band (OOB) emission signal that is based on a difference between the input baseband signal and the clipped signal; and
filter the predicted OOB emission signal in accordance with a target OOB emission spectrum to generate the excess signal.

18. The apparatus according to claim 17, further comprising front-end module (FEM) circuitry to up-convert, to a radio frequency (RF) range for transmission, an FEM input signal that is based on a difference between the baseband input signal and the excess signal.

19. The apparatus according to claim 18, wherein the excess signal jointly reduces the peak power of the input baseband signal and shapes an OOB emission spectrum of the FEM signal in accordance with the target OOB emission spectrum.

20. The apparatus according to claim 18, wherein:
the target OOB emission spectrum includes a notch at a predetermined target notch frequency outside of a pass-band of the input baseband signal,
the predetermined target notch frequency is based at least partly on an operating frequency of an adjacent frequency band in the RF range, and
the filtered predicted OOB emission signal reduces an expected OOB emission level that would be caused to an adjacent frequency by an output baseband signal that is based on the difference between the baseband input signal and the excess signal.

21. The apparatus according to claim 18, further comprising a baseband processor to generate the baseband input signal based on a group of data bits.

* * * * *